US012717629B2

(12) United States Patent
Chung et al.

(10) Patent No.: US 12,717,629 B2
(45) Date of Patent: Aug. 25, 2026

(54) METHOD AND APPARATUS FOR ALLOCATING TASK IN MULTI PROCESSOR

(71) Applicant: ELECTRONICS AND TELECOMMUNICATIONS RESEARCH INSTITUTE, Daejeon (KR)

(72) Inventors: Jaehoon Chung, Daejeon (KR); Young-Su Kwon, Daejeon (KR); Jin Ho Han, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 797 days.

(21) Appl. No.: 17/980,008

(22) Filed: Nov. 3, 2022

(65) Prior Publication Data

US 2023/0168936 A1 Jun. 1, 2023

(30) Foreign Application Priority Data

Nov. 3, 2021 (KR) ........................ 10-2021-0149383
Nov. 3, 2022 (KR) ........................ 10-2022-0145216

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | | |
|---|---|---|---|---|
| 9,134,787 | B2 * | 9/2015 | Longnecker | G06F 1/3237 |
| 9,652,019 | B2 | 5/2017 | Dongara et al. | |
| 9,805,303 | B2 * | 10/2017 | Ross | G06N 3/063 |
| 10,733,017 | B2 | 8/2020 | Kim et al. | |
| 10,997,274 | B2 * | 5/2021 | Ito | G06F 17/16 |
| 11,188,814 | B2 * | 11/2021 | Whatmough | G06N 3/04 |
| 11,275,713 | B2 * | 3/2022 | Giefers | G06F 7/504 |
| 11,429,439 | B2 | 8/2022 | Kim et al. | |
| 11,507,429 | B2 * | 11/2022 | Lyuh | G06F 9/30101 |
| 11,507,817 | B2 * | 11/2022 | Abdelaziz | G06N 3/063 |
| 11,803,736 | B1 * | 10/2023 | Meyer | G06F 9/3013 |

(Continued)

FOREIGN PATENT DOCUMENTS

| | | |
|---|---|---|
| KR | 10-2205836 B1 | 1/2021 |
| KR | 10-2272518 B1 | 7/2021 |

OTHER PUBLICATIONS

Zhang et al.; "Evaluating Low-Memory GEMMs for Convolutional Neural Network Inference on FPGAs"; 2020 IEEE 28th Annual International Symposium; DOI 10.1109/FCCM48280.2020.00013; (Zhang_2020.pdf, pp. 28-32) (Year: 2020).*

(Continued)

*Primary Examiner* — Hiren P Patel
(74) *Attorney, Agent, or Firm* — LRK PATENT LAW FIRM

(57) ABSTRACT

A method and apparatus for allocating tasks through relocating kernel data based on a size of systolic array included in each of the plurality of processors, and relocating input feature map (IFM) data based on a number of the plurality of processors are provided.

13 Claims, 8 Drawing Sheets

(56) References Cited

U.S. PATENT DOCUMENTS

| | | | | |
|---|---|---|---|---|
| 12,174,783 | B2 * | 12/2024 | Parra | G06F 9/30038 |
| 12,190,158 | B2 * | 1/2025 | Parra | G06F 9/5027 |
| 12,394,143 | B2 * | 8/2025 | Kaplanyan | G06T 1/20 |
| 2010/0037038 | A1 * | 2/2010 | Bieswanger | G06F 9/5094 713/300 |
| 2013/0198549 | A1 * | 8/2013 | Longnecker | G06F 1/3237 713/324 |
| 2016/0267111 | A1 * | 9/2016 | Shoaib | G06T 1/20 |
| 2016/0342891 | A1 * | 11/2016 | Ross | G06N 5/04 |
| 2016/0342893 | A1 * | 11/2016 | Ross | G06N 3/08 |
| 2017/0161611 | A1 * | 6/2017 | Ito | G06F 17/16 |
| 2018/0314671 | A1 * | 11/2018 | Zhang | G06N 3/063 |
| 2019/0079801 | A1 * | 3/2019 | Lyuh | G06F 15/8046 |
| 2019/0164037 | A1 * | 5/2019 | Kim | G06N 3/04 |
| 2020/0175355 | A1 | 6/2020 | Chung et al. | |
| 2020/0311183 | A1 * | 10/2020 | Simpson | G06F 17/16 |
| 2021/0019591 | A1 | 1/2021 | Venkatesh et al. | |
| 2021/0150313 | A1 * | 5/2021 | Roy | G06N 3/045 |
| 2021/0326686 | A1 * | 10/2021 | Abdelaziz | G06F 9/30036 |
| 2021/0357736 | A1 * | 11/2021 | Lu | G06F 5/01 |
| 2022/0138563 | A1 * | 5/2022 | Kwon | G06N 3/08 706/25 |
| 2022/0207356 | A1 * | 6/2022 | Kim | G06N 3/044 |
| 2022/0413851 | A1 * | 12/2022 | Gurram | G06F 9/30036 |

OTHER PUBLICATIONS

Geng et al.; “AWB-GCN: A Graph Convolutional Network Accelerator with Runtime Workload Rebalancing”; 2020 53rd Annual IEEE/ACM International Symposium on Microarchitecture; DOI 10.1109/MICRO50266.2020.00079; (Geng_2020.pdf) (Year: 2020).*

Xu et al.; “Configurable Multi-directional Systolic Array Architecture for Convolutional Neural Networks”; ACM Transactions on Architecture and Code Optimization, vol. 18, No. 4, Article 42. Publication date: Jul. 2021; https://doi.org/10.1145/3460776 (Xu_2021.pdf) (Year: 2021).*

Chen et al.; “Dynamic Heterogeneous Voltage Regulation for Systolic Array-Based DNN Accelerators”; 2020 IEEE 38th International Conference on Computer Design; DOI: 1031109/ICCD50377.2020.00088; (Chen_2020.pdf) (Year: 2020).*

* cited by examiner

FIG. 4

METHOD AND APPARATUS FOR ALLOCATING TASK IN MULTI PROCESSOR

CROSS-REFERENCE TO RELATED APPLICATIONS

This application claims priority to and the benefit of Korean Patent Application No. 10-2021-0149383 filed in the Korean Intellectual Property Office on Nov. 3, 2021, and Korean Patent Application No. 10-2022-0145216 filed in the Korean Intellectual Property Office on Nov. 3, 2022, the entire contents of which are incorporated herein by reference.

BACKGROUND

1. Technical Field

This description relates to a method and an apparatus for allocating tasks to multi-processors.

2. Description of Related Art

A multi processor is a computer system including a plurality of processing devices and each processing device may share peripherals and memory for tasks such as simultaneous processing of a program.

A systolic array is a processor network in which neighboring processors in a multi-processor structure calculate data and pass the data through the system. It can be applied to algorithms with a regular and local flow of data and a large amount of computation.

SUMMARY

An embodiment provides an apparatus for allocating tasks to a plurality of processors.

Another embodiment provides a method for allocating tasks to a plurality of processors.

Yet another embodiment provides a method for performing tasks using a plurality of processors.

According to an embodiment, an apparatus for allocating tasks to a plurality of processors is provided. The apparatus includes: a control processor and a memory, wherein the control processor executes a program stored in the memory to perform: relocating kernel data based on a size of systolic array included in each of the plurality of processors; and relocating input feature map (IFM) data based on a number of the plurality of processors.

In an embodiment, when relocating kernel data based on a size of systolic array included in each of the plurality of processors, the control processor may perform relocating the kernel data to a plurality of memories connected to columns of the systolic array.

In an embodiment, when relocating kernel data based on a size of systolic array included in each of the plurality of processors, the control processor may perform: dividing the kernel data into a plurality of sub-data; and allocating the plurality of sub-data to upper memory in the systolic array.

In an embodiment, a number of the plurality of sub-data may be equal to a number of columns of the systolic array.

In an embodiment, when relocating IFM data based on a number of the plurality of processors, the control processor may perform: relocating the IFM data to all rows in the systolic array of some processors among the plurality of processors; and relocating the IFM data to at least one row in the systolic array of the remaining processors among the plurality of processors.

In an embodiment, when relocating IFM data based on a number of the plurality of processors, the control processor may perform relocating the IFM data disposed in the same number to each of the plurality of processors to a different number of processors with a smaller number than the plurality of processors.

In an embodiment, when relocating IFM data based on a number of the plurality of processors, the control processor may perform relocating the IFM data in a memory coupled to an idle processing element (PE) of some processors among the plurality of processors when the idle PE occurs in the plurality of processors due to arranging of the IFM data.

In an embodiment, when relocating IFM data based on a number of the plurality of processors, the control processor may perform relocating the IFM data to a memory that transfers data to an idle area of some processors among the plurality of processors when the idle area occurs in the plurality of processors due to arranging of the IFM data.

According to another embodiment, a method for allocating tasks to a plurality of processors is provided. The method includes: relocating kernel data based on a size of systolic array included in each of the plurality of processors; and relocating input feature map (IFM) data based on a number of the plurality of processors.

In an embodiment, the relocating kernel data based on a size of systolic array included in each of the plurality of processors may include relocating the kernel data to a plurality of memories connected to columns of the systolic array.

In an embodiment, the relocating kernel data based on a size of systolic array included in each of the plurality of processors may include: dividing the kernel data into a plurality of sub-data; and allocating the plurality of sub-data to upper memory in the systolic array.

In an embodiment, a number of the plurality of sub-data may be equal to a number of columns of the systolic array.

In an embodiment, the relocating IFM data based on a number of the plurality of processors may include: relocating the IFM data to all rows in the systolic array of some processors among the plurality of processors; and relocating the IFM data to at least one row in the systolic array of the remaining processors among the plurality of processors.

In an embodiment, the relocating IFM data based on a number of the plurality of processors may include relocating the IFM data disposed in the same number to each of the plurality of processors to some processors among the plurality of processors in a different number.

In an embodiment, the relocating IFM data based on a number of the plurality of processors may include relocating the IFM data in a memory coupled to an idle processing element (PE) of some processors among the plurality of processors when the idle PE occurs in the plurality of processors due to arranging of the IFM data.

In an embodiment, the relocating IFM data based on a number of the plurality of processors may include relocating the IFM data to a memory that transfers data to an idle area of some processors among the plurality of processors when the idle area occurs in the plurality of processors due to arranging of the IFM data.

According to yet another embodiment, a method for performing a task using a plurality of processors is provided. The method includes: relocating kernel data based on a size of systolic array included in each of the plurality of processors; relocating input feature map (IFM) data based on a number of the plurality of processors; and performing the task using the relocated kernel data and the relocated IFM data.

BRIEF DESCRIPTION OF THE DRAWINGS

FIG. 4 is a schematic diagram illustrating a method for removing unnecessary logic switching according to an embodiment.

DETAILED DESCRIPTION OF THE EMBODIMENTS

Figure 1:
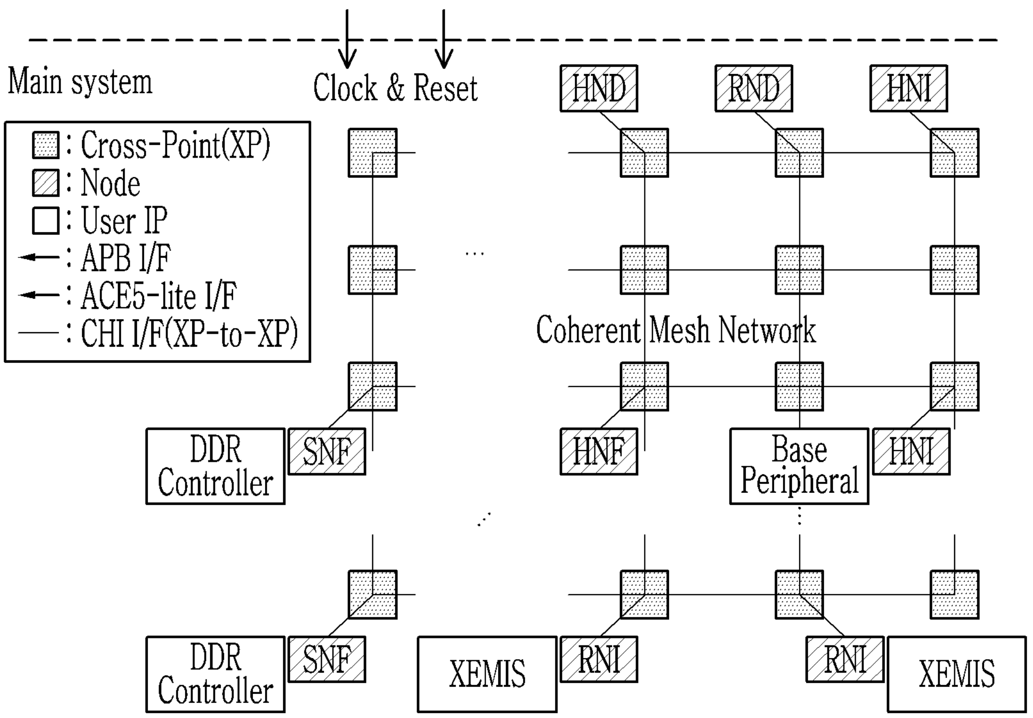
FIG. 1 is a diagram illustrating a multi-processor according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

Figure 2:
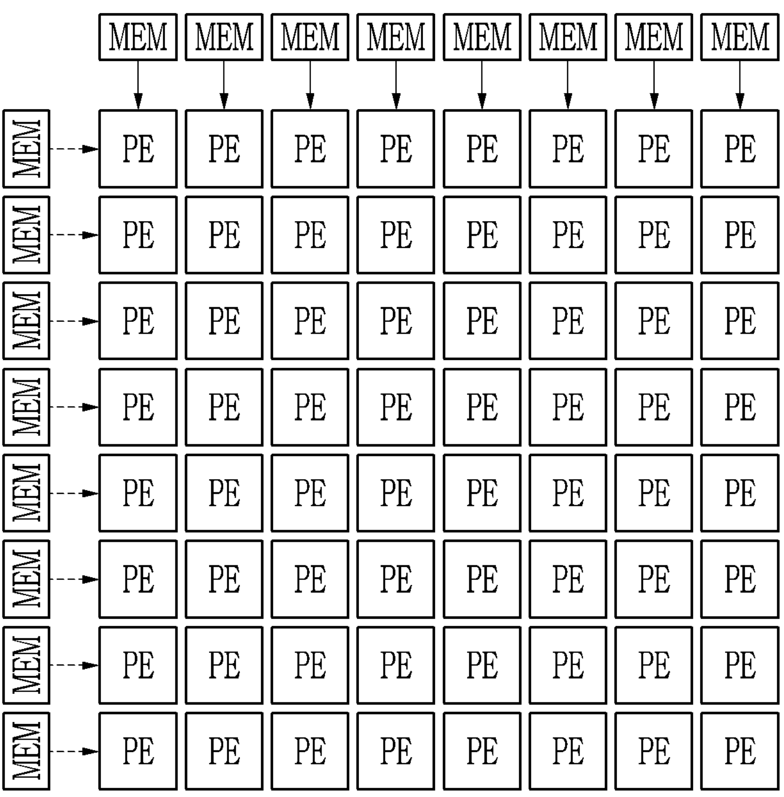
FIG. 2 is a diagram illustrating a systolic array according to an embodiment.

FIG. 1 is a diagram illustrating a multi-processor according to an embodiment and FIG. 2 is a diagram illustrating a systolic array according to an embodiment.

A multiprocessor system is a system in which two or more processors share internal resources (e.g., memory) on a chip. Referring to FIG. 1, Each processor and the internal resource in the multiprocessor system may be connected to each other through a mesh network (e.g., coherent mesh network) and may be located to each node in the mesh network.

Since data can be efficiently shared between each processor of the multiprocessor, the multiprocessor system can show high performance in processing large capacity data.

Referring to FIG. 2, a systolic array may include a plurality of processing elements (PEs) disposed in the form of a two-dimensional array and a plurality of memorys (MEMs) to supply input data to the plurality of Pes and store output data from the plurality of PEs. The systolic arrays may be suitable for operations in which input data is reused, such as add/multiply operations between matrices.

The basic operation flow of the systolic array shown in FIG. 2 may include the following four steps. In an embodiment, the systolic array may compute matrix Y by multiplying matrix N by matrix M (N×M=Y). The matrix N a p×q matrix, the matrix M is a q×r matrix, and the matrix Y is a p×r matrix.

1) Preparing Input Data

Data of each row of the matrix N may be stored in a memory depicted on the left side (MEM_left) of FIG. 2 and data of each column of the matrix M may be stored in a memory depicted in the upper part (MEM_upper) of FIG. 2.

2) Transferring the Input Data

Data corresponding to each row of the matrix N may be sequentially output one by one from the MEM_left to the PEs. At the same time, the MEM_upper may sequentially output data corresponding to each column of the matrix M one by one to the PEs.

3) Data sequentially output from the MEM_left and the MEM_upper may be used as operands in ADD and/or MUL operations in the PE.

Each PE may transfer corresponding data to neighboring PEs every cycle. For example, when the position of the top left PE is (0,0) and the position of the bottom right PE is (N,N), the data of the matrix N may be transferred from (x,y) to (x+1,y) and the data of the matrix M may be transferred from (x,y) to (x,y+1).

4) The result of the operation (e.g., ADD and/or MUL operation) performed in the PE may be stored in a register inside the PE.

Afterwards, the result value accumulated in the register may be sequentially transferred between the PEs in a predetermined direction (e.g., a direction toward the MEM_left).

Power may be consumed in a semiconductor by static power due to leakage current and dynamic power due to switching of each CMOS cell.

The static power may be always consumed regardless of the operation of the chip and may be affected by the structure and temperature of the transistor. The static power may be expressed as Equation 1 below.

$$P_{static} = \mathrm{V}\left(c1T^2e^{\frac{c2}{T}} + I_{gate}\right) \quad \text{(Equation 1)}$$

In equation 1, V is the operating voltage of the chip and T is the junction temperature of the chip. c1 and c2 are hardware-dependent constants and $I_{gate}$ is the leakage current from the gate.

The dynamic power may be consumed according to the operation of the chip and may increase in proportion to switching activity and operation frequency. The dynamic power may be expressed as Equation 2 below.

$$P_{dynamic}=\alpha CV^2F \quad \text{(Equation 2)}$$

In equation 2, a is the switching activity, C is a hardware dependent constant, V is the operating voltage, and F is the operating frequency. The switching activity is a measure that indicates the frequency at which the state of each cell changes during unit time and may have a value between 0 and 1. For example, if a specific register repeatedly outputs 0 and 1 for every clock, $\alpha=1$ and if the register continuously outputs 0 or 1, $\alpha=0$.

Figure 3:
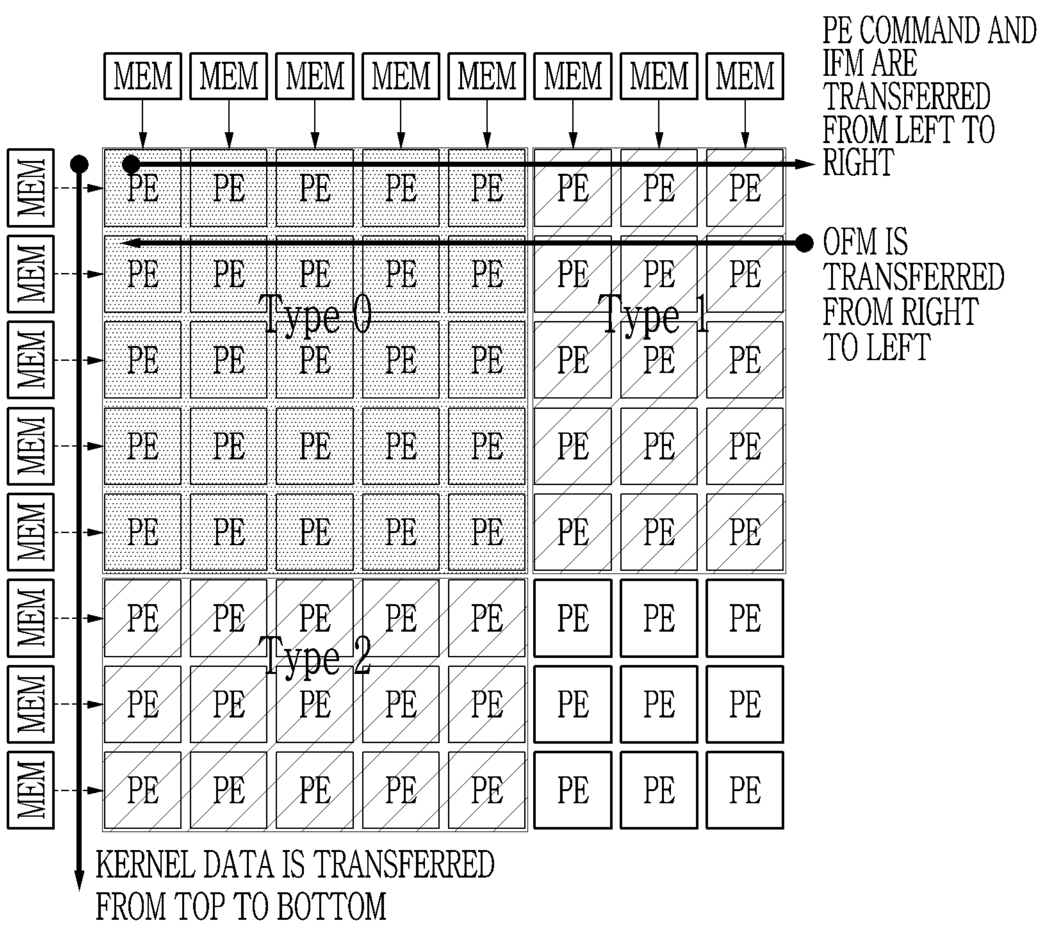
FIG. 3 is a diagram illustrating a systolic array according to another embodiment.

FIG. 3 is a diagram illustrating a systolic array according to another embodiment.

In a systolic array in an artificial intelligence processor, the number of rows and columns used for operations may be determined according to the structure of a neural network. Below, the number of rows used in an operation is R and the number of columns used in an operation is C. Each systolic array may correspond to one processor.

Data supplied to the systolic array may be transferred to a neighboring PE for every cycle in a direction predetermined in advance according to the type of the data. Input feature map (IFM) data and PE command data may be passed from left to right in FIG. 3. Output feature map (OFM) data may be passed from right to left in FIG. 3. Kernel data may be passed from top to bottom in FIG. 3.

Data supplied from a block (e.g., memory, etc.) outside of the systolic array may be transferred up to MAX(R) or MAX(C) regardless of the R value and C value, which can cause unnecessary logic switching.

For example, a region where different logic switching aspects occur in a systolic array having an 8×8 size may be distinguished in FIG. 3.

In FIG. 3, a Type 0 area may be an area where logic switching occurs by a PE performing an actual operation for neural network algorithm processing. In FIG. 3, a Type 1 area may be an area where logic switching occurs by a PE performing an ineffective processing due to the IFM data and the PE command data transferred from the Type 0 area. The Type 1 area may have nothing to do with the neural network algorithm processing. In FIG. 3, a Type 2 area may be an area where logic switching occurs due to the kernel data transferred from the Type 0 area.

When a plurality of same neural network data is processed in parallel in the multiprocessor structure, if a PE to perform an operation is allocated in the above manner, the unnecessary logic switching may accumulate, therefore, it ca be inefficient in terms of power management. Therefore, the unnecessary logic switching may be removed according to the aspect of logic switching for the efficient management of power.

Figure 4:
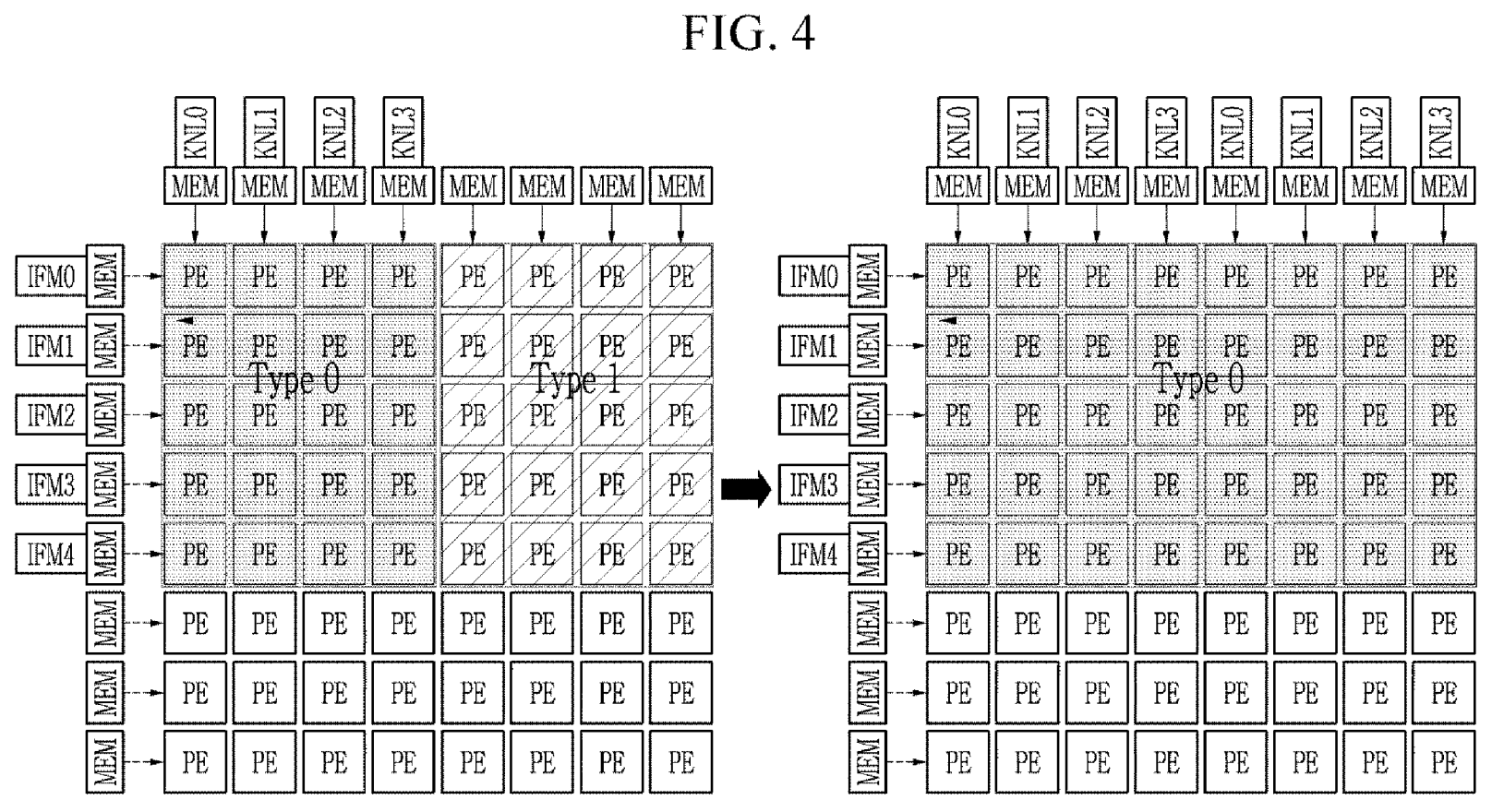
Figure 5:
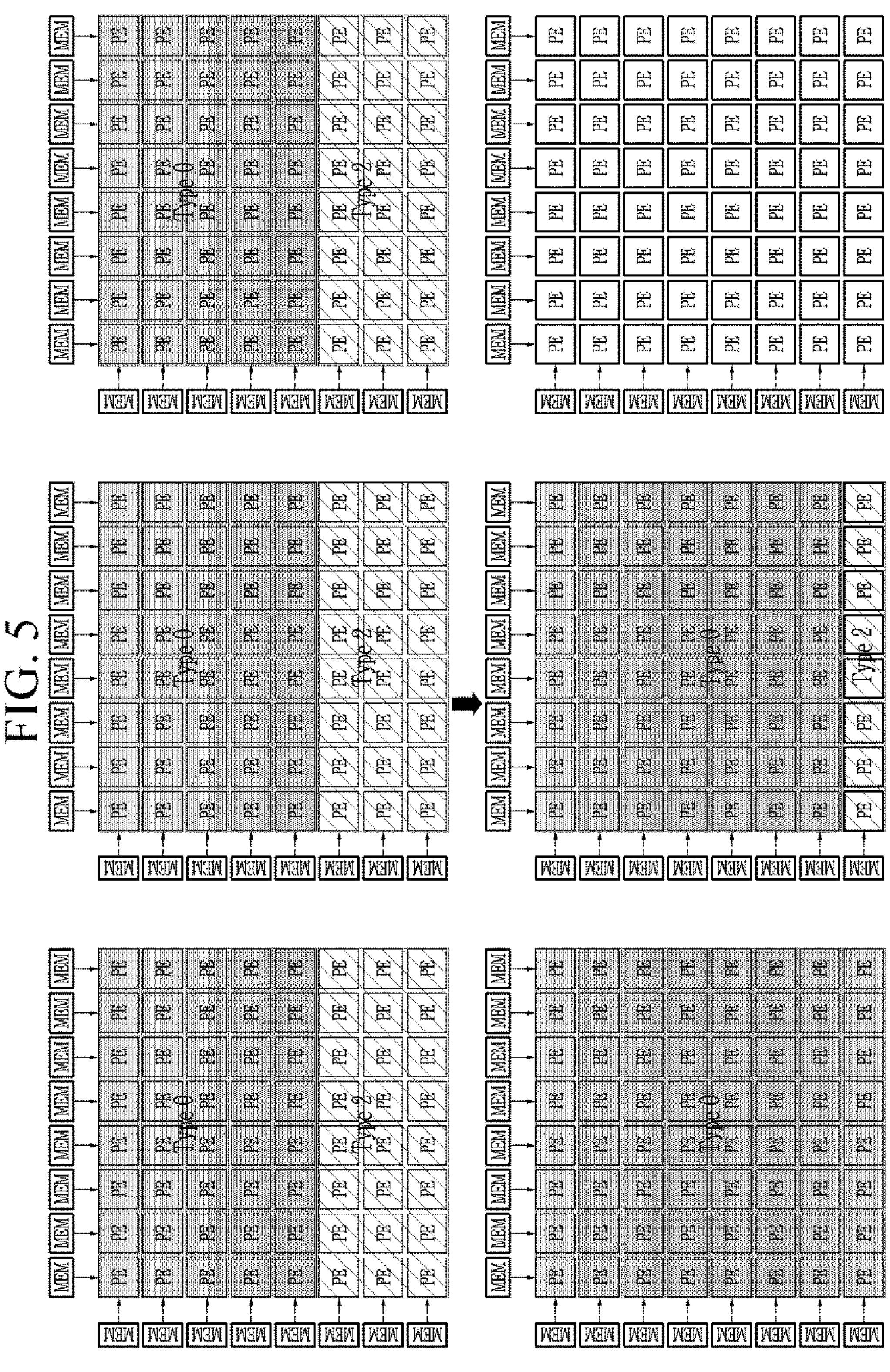
FIG. 5 is a schematic diagram illustrating a method for removing unnecessary logic switching according to another embodiment.

FIG. 4 is a schematic diagram illustrating a method for removing unnecessary logic switching according to an embodiment and FIG. 5 is a schematic diagram illustrating a method for removing unnecessary logic switching according to another embodiment.

In order to eliminate or minimize the type 1 area, the C may be maximized by dividing or replicating the kernel data into n pieces. Referring to FIG. 4, the kernel data located in the left four memories may be relocated to all eight memories above. That is, all columns in the systolic array may be used for operations through the division/replication of the kernel data.

In order to remove or minimize the type 2 area, the IFM data located in a specific processor may be divided into m pieces and then relocated to m different processors. Referring to FIG. 5, the IFM data required for operations may be divided into two pieces and relocated to two different processors, respectively, so the size of the type 2 area is minimized and the third processor may not be used.

As above, by reconfiguring tasks allocated to a plurality of processors and re-allocating them to some processors, power waste due to the unnecessary switching may be reduced and the leakage current in the processor in an idle state may be blocked by applying power gating to processors in the idle state.

Figure 6:
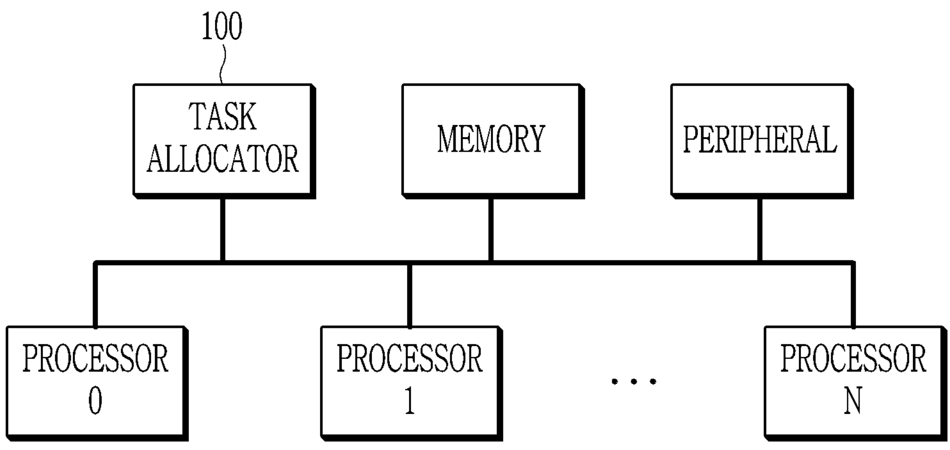
FIG. 6 is a diagram illustrating a multi-processor system including a task allocator according to an embodiment.
Figure 7:
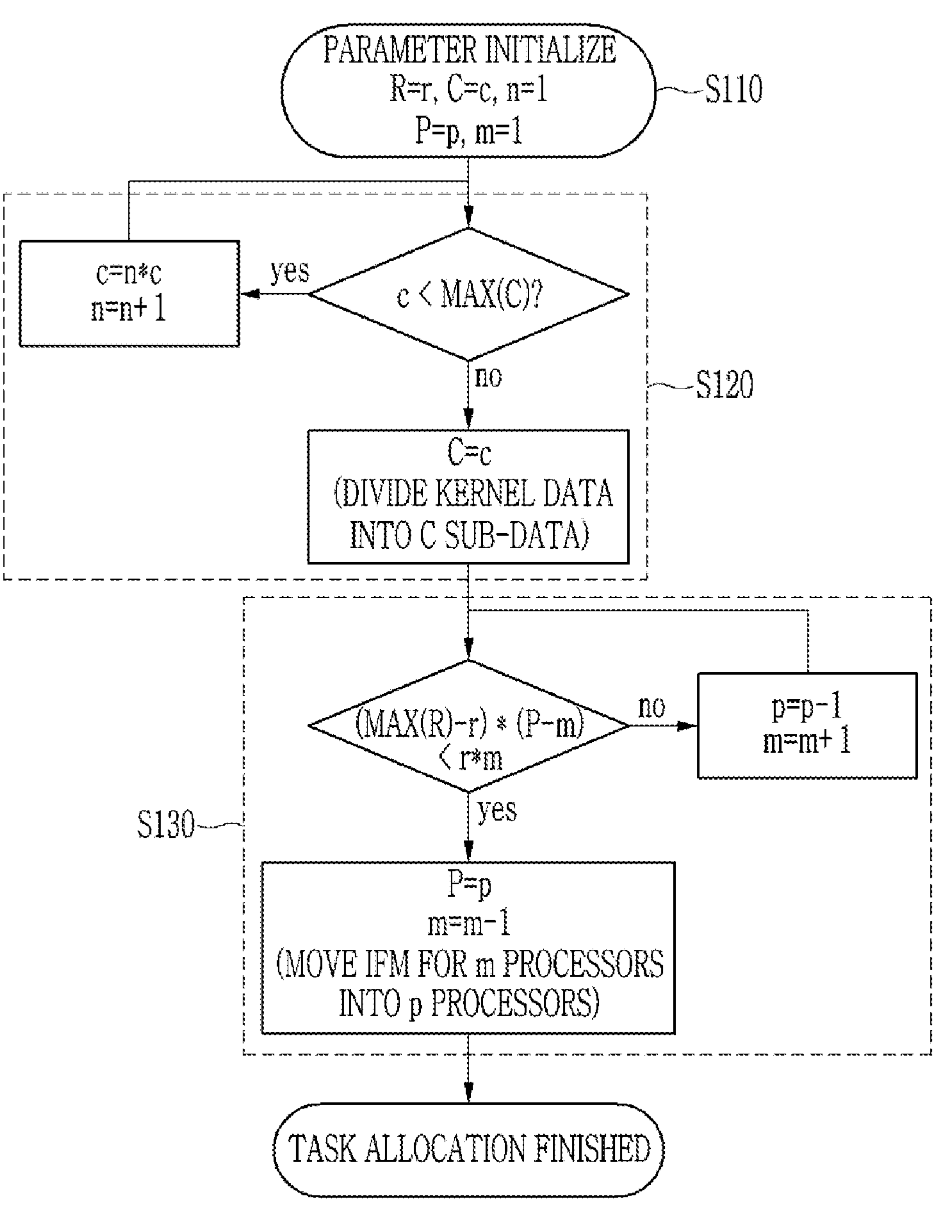
FIG. 7 is a flowchart illustrating a task allocation method of a task allocator according to an embodiment.

FIG. 6 is a diagram illustrating a multi-processor system including a task allocator according to an embodiment and FIG. 7 is a flowchart illustrating a task allocation method of a task allocator according to an embodiment.

Referring to FIG. 6, a task allocator 100 according to an embodiment may allocate tasks to a plurality of processors. Each processor may have a systolic array structure and send and receive signals with memory and peripherals.

Referring to FIG. 7, the task allocator 100 according to an embodiment may initialize related parameters to allocate the tasks to each processor (S110). In FIG. 7, R is a parameter representing the number of rows used for operations within the systolic array and C is a parameter representing the number of columns used for operations within the systolic array. n is a parameter representing the number of sub-data of the kernel, P is a parameter representing the number of processors used for neural network algorithm processing within the multi-processor system, and m is a parameter representing the number of processors that enter the idle state due to the relocation of data among the processors to which the tasks are allocated.

After that, the task allocator 100 may relocate the kernel data based on the size of the systolic array included in each processor (S120). The task allocator 100 may relocate the kernel data to the memory connected to every row in the systolic array.

In an embodiment, the task allocator 100 may determine whether the number of columns of the systolic array used for the operation is equal to the number of entire columns of the systolic array. The task allocator 100 may relocate the kernel data to all columns in the systolic array when the number of columns used for the operation is equal to the number of entire columns in the systolic array. That is, when the number c of columns used for operation in the systolic array reaches MAX(C) which is the number of all columns in the systolic array, the kernel data may be divided into c sub-data and the divided kernel data may be relocated.

In addition, the task allocator 100 may relocate the IFM data based on the number of processors used for operation (S130). When an idle PE occurs in a processor due to distributed IFM data, the task allocator 100 may relocate the IFM data to a memory connected to the idle PE of some processors among the plurality of processors. Alternatively, when an idle area occurs in a processor due to the distributed IFM data, the task allocator 100 may relocate the IFM data to a memory that transfers data to an idle area of some processors among the plurality of processors.

In an embodiment, the task allocator 100 may relocate the IFM data based on the comparison result between the size of the idle area in the plurality of processors and the product r×m of the number r of rows used for an operation within one processor and the number m of processors that enter the idle state due to data relocation. The size of the idle area in the plurality of processors may be determined by (the total number of rows in the systolic array MAX(R)−the number of rows used for operation r)×(the total number of processors P−the number of processors that will enter the idle state due to the data relocation m). When the size of the entire idle area becomes smaller than the size of r×m, the task allocator 100 may relocate the IFM data distributed in m processors to p processors.

That is, the task allocator 100 may relocate the IFM data to all rows in the systolic array of some processors among the plurality of processors and relocate the IFM data to some rows in the systolic array of remaining processors among the plurality of processors.

Consequently, the task allocator 100 may relocate the IFM data distributed in the same number to all of the plurality of processors to some processors among the plurality of processors. All rows of the systolic array of a-1 processors among the some processors may be used for operations and some rows of the systolic array of remaining processor among the some processors may be used for operations.

As above, unnecessary power consumption and waste can be minimized by minimizing the number of idle PEs through the relocation of tasks.

Figure 8:
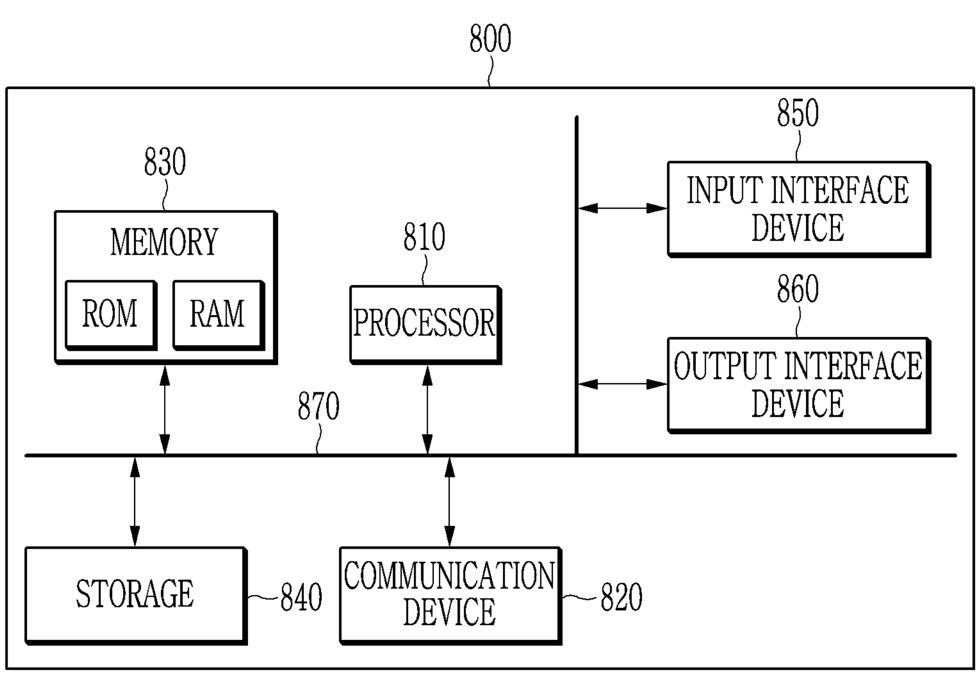
FIG. 8 is a block diagram illustrating an apparatus for allocating tasks according to an embodiment.

FIG. 8 is a block diagram illustrating an apparatus for allocating tasks according to an embodiment.

The apparatus for allocating tasks according to embodiments may be implemented as a computer system, for example, a computer-readable medium. Referring to FIG. 8, the computer system 800 may include at least one of a processor 810, a memory 830, an input interface device 850, an output interface device 860, and a storage device 840 communicating through a bus 870. The computer system 800 may also include a communication device 820 coupled to the network. The processor 810 may be a central processing unit (CPU) or a semiconductor device that executes instructions stored in the memory 830 or the storage device 840. The memory 830 and the storage device 840 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 820 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An apparatus for allocating tasks to a plurality of processors, the apparatus comprising:

a control processor and a memory, wherein the control processor executes a program stored in the memory to perform:

relocating kernel data based on a size of systolic array included in each of the plurality of processors; and relocating input feature map (IFM) data based on a number of the plurality of processors, wherein, when relocating kernel data based on a size of systolic array included in each of the plurality of processors, the control processor performs:

dividing the kernel data into a plurality of sub-data; and allocating the plurality of sub-data to upper memory in the systolic array, wherein a number of the plurality of sub-data is equal to a number of columns of the systolic array, wherein the control processor is configured to:

calculate a size of an idle area within the plurality of processors;

compare the size of the idle area with a result obtained by multiplying a number of rows used for an operation within a single processor by a number of processors, among the plurality of processors, that enter an idle state due to relocation of the input feature map data; and intentionally re-allocate tasks from a first plurality of processors to a second, smaller plurality of processors such that at least one processor is rendered idle at a processor level, and wherein power gating is applied to the at least one idle processor to block leakage current.

2. The apparatus of claim 1, wherein:

when relocating kernel data based on a size of systolic array included in each of the plurality of processors, the control processor performs relocating the kernel data to a plurality of memories connected to columns of the systolic array.

3. The apparatus of claim 1, wherein:

when relocating IFM data based on a number of the plurality of processors, the control processor performs:

relocating the IFM data to all rows in the systolic array of some processors among the plurality of processors; and relocating the IFM data to at least one row in the systolic array of the remaining processors among the plurality of processors.

4. The apparatus of claim 1, wherein:

when relocating IFM data based on a number of the plurality of processors, the control processor performs:

relocating the IFM data disposed in the same number to each of the plurality of processors to a different number of processors with a smaller number than the plurality of processors.

5. The apparatus of claim 1, wherein:

when relocating IFM data based on a number of the plurality of processors, the control processor performs:

relocating the IFM data in a memory coupled to an idle processing element (PE) of some processors among the plurality of processors when the idle PE occurs in the plurality of processors due to arranging of the IFM data.

6. The apparatus of claim 1, wherein:

when relocating IFM data based on a number of the plurality of processors, the control processor performs relocating the IFM data to a memory that transfers data to an idle area of some processors among the plurality of processors when the idle area occurs in the plurality of processors due to arranging of the IFM data.

7. A method for allocating tasks to a plurality of processors, the method comprising:

relocating kernel data based on a size of systolic array included in each of the plurality of processors; and relocating input feature map (IFM) data based on a number of the plurality of processors, wherein the relocating kernel data based on a size of systolic array included in each of the plurality of processors comprises:

dividing the kernel data into a plurality of sub-data; and allocating the plurality of sub-data to upper memory in the systolic array, wherein a number of the plurality of sub-data is equal to a number of columns of the systolic array, wherein the control processor is configured to:

calculate a size of an idle area within the plurality of processors;

compare the size of the idle area with a result obtained by multiplying a number of rows used for an operation within a single processor by a number of processors, among the plurality of processors, that enter an idle state due to relocation of the input feature map data; and intentionally re-allocate tasks from a first plurality of processors to a second, smaller plurality of processors such that at least one processor is rendered idle at a processor level, and wherein power gating is applied to the at least one idle processor to block leakage current.

8. The method of claim 7, wherein:

the relocating kernel data based on a size of systolic array included in each of the plurality of processors comprises relocating the kernel data to a plurality of memories connected to columns of the systolic array.

9. The method of claim 7, wherein:

the relocating IFM data based on a number of the plurality of processors comprises:

relocating the IFM data to all rows in the systolic array of some processors among the plurality of processors; and relocating the IFM data to at least one row in the systolic array of the remaining processors among the plurality of processors.

10. The method of claim 7, wherein:

the relocating IFM data based on a number of the plurality of processors comprises relocating the IFM data disposed in the same number to each of the plurality of processors to some processors among the plurality of processors in a different number.

11. The method of claim 7, wherein:

the relocating IFM data based on a number of the plurality of processors comprises relocating the IFM data in a memory coupled to an idle processing element (PE) of some processors among the plurality of processors when the idle PE occurs in the plurality of processors due to arranging of the IFM data.

12. The method of claim 7, wherein:

the relocating IFM data based on a number of the plurality of processors comprises relocating the IFM data to a memory that transfers data to an idle area of some processors among the plurality of processors when the idle area occurs in the plurality of processors due to arranging of the IFM data.

13. A method for performing a task using a plurality of processors, the method comprising:

relocating kernel data based on a size of systolic array included in each of the plurality of processors;

relocating input feature map (IFM) data based on a number of the plurality of processors; and performing the task using the relocated kernel data and the relocated IFM data wherein the relocating kernel data based on a size of systolic array included in each of the plurality of processors comprises:

dividing the kernel data into a plurality of sub-data; and allocating the plurality of sub-data to upper memory in the systolic array, wherein a number of the plurality of sub-data is equal to a number of columns of the systolic array, wherein the control processor is configured to:

calculate a size of an idle area within the plurality of processors;

compare the size of the idle area with a result obtained by multiplying a number of rows used for an operation within a single processor by a number of processors, among the plurality of processors, that enter an idle state due to relocation of the input feature map data; and intentionally re-allocate tasks from a first plurality of processors to a second, smaller plurality of processors such that at least one processor is rendered idle at a processor level, and wherein power gating is applied to the at least one idle processor to block leakage current.

* * * * *